UNITED STATES PATENT OFFICE.

NEKOLAI DAHL, OF TRONDHJEM, NORWAY.

FREEZING FISH AND OTHER GOODS IN CASES OR FREEZING-MOLDS.

1,235,661. Specification of Letters Patent. Patented Aug. 7, 1917.

No Drawing. Application filed June 5, 1917. Serial No. 172,989.

*To all whom it may concern:*

Be it known that I, NEKOLAI DAHL, a subject of the King of Norway, residing at Trondhjem, in the Kingdom of Norway, have invented certain new and useful Improvements in Freezing Fish and other Goods in Cases or Freezing-Molds; and I do hereby declare the following to be a full, clear, and exact description of the invention, such as will enable others skilled in the art to which it appertains to make and use the same.

This invention relates to the refrigeration of fish and other goods and has for its object an improved method of effecting such refrigeration in cases or freezing molds.

In freezing fish in refrigeration plants excessively long time has hitherto been necessary in order to effect the freezing of such goods in larger export cases.

According to the method which has been used in connection with the use of circulating cooling fluid, goods such as herrings and other fish have been packed in their natural condition in cases, and have been cooled and frozen by means of passing the cooling fluid through the fish or goods parcel in a direction transversely to the longitudinal direction of the fish or goods.

When herrings and other fish, having a lower weight than the cooling fluid employed, are to be frozen an efficient freezing is obtained by means of this method.

Some kinds of fish and more especially fishes in a gutted condition are however of a higher weight than the cooling fluid, and when such fish are placed in a fresh condition in cases, they will be packed together to a solid mass when the cooling fluid is supplied from the side or more correctly expressed in a direction transversely to the longitudinal direction of the fish.

By this packing the cooling fluid is prevented from passing through the parcel of fish and from getting into contact with each single fish or with the whole of each fish.

When the freezing should take place rapidly this results therein that some fishes or parts of each single fish remain unfrozen, and this again makes the parcel unsuitable for storing or transfer.

According to the present invention an efficient and complete freezing is brought about in the manner that the cooling fluid during the freezing operation is caused to pass through the fish or goods parcel in the longitudinal direction of the fish or the pieces of goods.

Each single fish or each single piece of goods is then rapidly and completely frozen through the whole mass.

This result could be attained whether the goods are arranged in a vertical position or in a position at an angle to the vertical as well as when the fishes or goods are placed in the case in a horizontal direction when only the cooling fluid in this latter instance is passed through the case in a horizontal direction and parallel to or substantially parallel to each single fish or piece of goods. Also in this latter instance the fluid will surround each single piece of goods considerably better than when the circulation takes place transversely to the longitudinal direction of the fish.

According to the present method the fish is placed in ordinary export cases or other cases in horizontal layers as usual, and when the case is filled, the cover is put on or fastened by means of nails. According to the prior freezing methods the cases during the freezing operation have been placed in different positions but the cooling fluid has always been supplied transversely to the longitudinal direction of the fish.

In practising the present method it will be of advantage to so place the cases that the fish or the goods in the same will take up a vertical or substantially vertical position during the freezing. To attain, that the cooling fluid passes through the parcel in the longitudinal direction of the pieces of goods, the case is suitably so constructed that the walls, which during the freezing are in a horizontal or substantially horizontal position, are provided with one or more openings, serving as inlets and outlets for the cooling fluid. Only a single opening or hole in each of the said walls is necessary, the said opening being suitably tightened by means of a stopper or otherwise when the freezing is finished. Covers of special construction are not necessary in connection with this method, and the method involves in every respect as little of work and mechanical devices as possible.

The advantage of this method more especially consists therein, that the cooling fluid is distributed between the single fishes or pieces of goods, even when the fishes or the goods are of a higher weight than the cooling fluid and even when the fishes or the goods are tightly packed in large cases each containing several hundred of kg.

I claim:

1. Method of freezing fish and other goods in cases or freezing molds which consists in packing and arranging the pieces of goods in such a manner in the case that each single piece is substantially parallel to the other pieces of goods and passing cooling fluid through the goods in a direction substantially parallel to the longitudinal direction of the said pieces of goods.

2. Method of freezing fish and other goods in cases or freezing molds which consists in packing and arranging the pieces of goods in such a manner in the case that each single piece is substantially parallel to the other pieces of goods and passing cooling fluid through the goods in a direction substantially parallel to the longitudinal direction of the said pieces of goods until the whole parcel is frozen throughout.

In testimony that I claim the foregoing as my invention, I have signed my name in presence of two subscribing witnesses.

NEKOLAI DAHL.

Witnesses:
STEFAN OKKENHANG,
FORDIS KRIKUL.